United States Patent

Baumgarten et al.

[11] Patent Number: 5,403,235
[45] Date of Patent: Apr. 4, 1995

[54] DEVICE FOR SEPARATING AND SCREENING OF BULK MATERIALS AND A SELF-PROPELLED COMBINE WITH SUCH A DEVICE

[75] Inventors: Joachim Baumgarten, Beelen; Franz Glaubitz, Harsewinkel, both of Germany

[73] Assignee: Claas oHG beschrankt haftende offene Handelsgesellschaft, Harsewinkel, Germany

[21] Appl. No.: 87,462

[22] Filed: Jul. 8, 1993

[30] Foreign Application Priority Data

Jul. 8, 1992 [DE] Germany .................. 42 22 364.4

[51] Int. Cl.⁶ ................................................ A01F 12/32
[52] U.S. Cl. ................................ 460/101; 209/139.1
[58] Field of Search ............... 209/23, 28, 29, 139.1, 209/142, 143, 138; 460/90–92, 101, 102

[56] References Cited

U.S. PATENT DOCUMENTS

| | | | |
|---|---|---|---|
| 532,550 | 1/1895 | Haggenmacher | 209/29 |
| 1,056,527 | 3/1913 | Foster | 209/23 X |
| 2,554,416 | 5/1951 | Morrissey | |
| 2,670,845 | 3/1954 | Busack et al. | 460/101 X |
| 3,374,886 | 3/1968 | Lightsey | 209/28 |
| 4,511,466 | 4/1985 | Jones et al. | 460/101 X |
| 4,723,558 | 2/1988 | Usick | 460/101 X |
| 5,041,059 | 8/1991 | Ricketts et al. | 460/101 |

FOREIGN PATENT DOCUMENTS

| | | |
|---|---|---|
| 308864 | 8/1951 | Germany . |
| 1147077 | 4/1963 | Germany . |
| 1199594 | 8/1965 | Germany . |
| 2245125 | 4/1973 | Germany . |
| 7730827 | 10/1977 | Germany . |
| 2620875 | 11/1977 | Germany . |
| 3407326 | 2/1987 | Germany . |
| 1468608 | 4/1987 | U.S.S.R. . |

Primary Examiner—D. Glenn Dayoan
Attorney, Agent, or Firm—Browdy and Neimark

[57] ABSTRACT

The device for separating and screening bulk materials, in particular crop materials, is formed by a zig-zag separator (9) with separation conduits (14) which are diverted once or several times in the vertical direction and through which a separator air stream (SL) flows, and its top and bottom which is covered by the bulk material (6, 7)—crop material—forms a screening surface (9a). The zig-zag separator (9) forms a cross flow orientation of the rising separator air flow (SL) at the bends (14a) of its separator conduits (14) and a rotating material vortex (GW) in the separator conduits (14), by means of which the light chaff/stalk parts (7) are moved upward and the grain (6) is released downward.

17 Claims, 3 Drawing Sheets

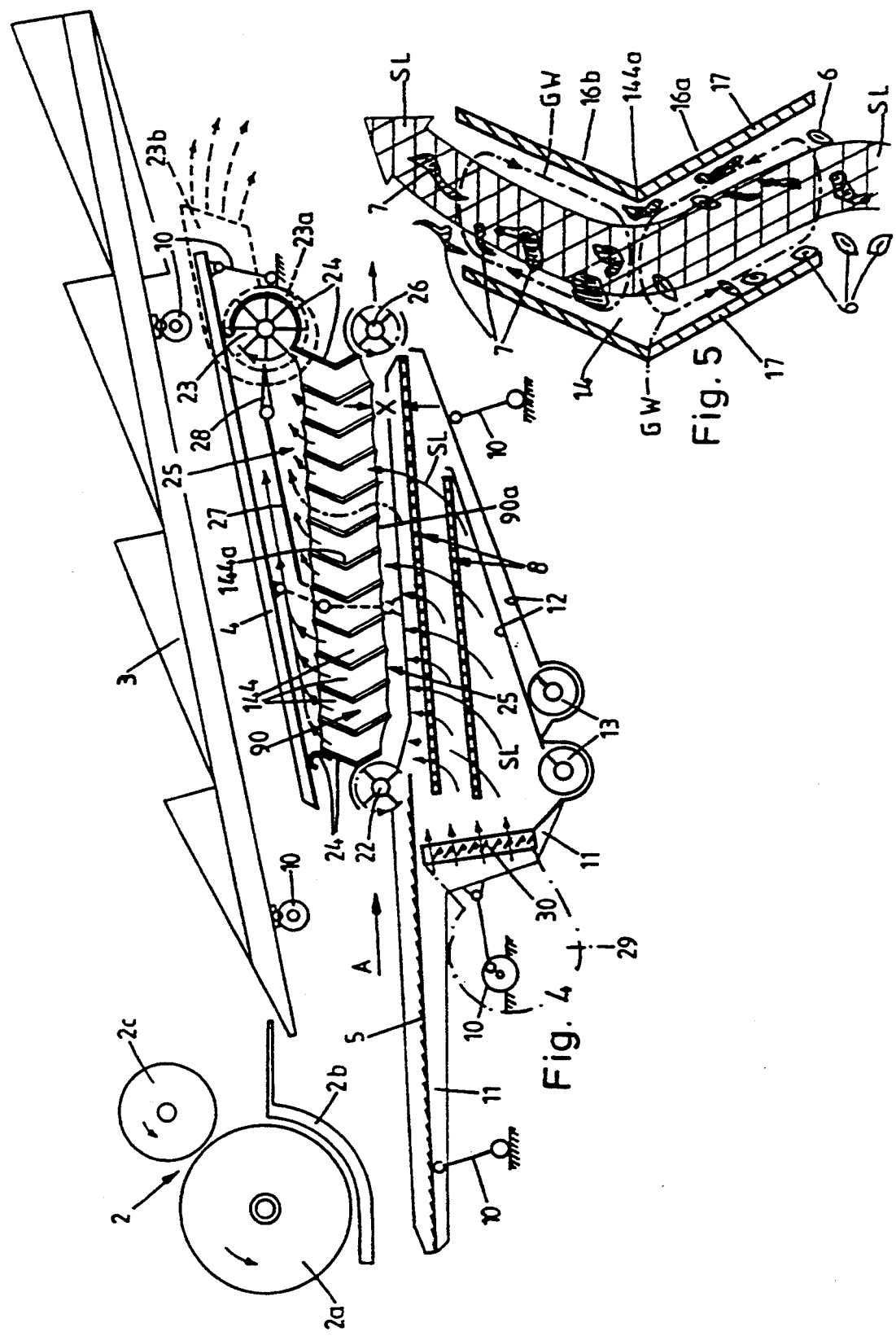

DEVICE FOR SEPARATING AND SCREENING OF BULK MATERIALS AND A SELF-PROPELLED COMBINE WITH SUCH A DEVICE

TECHNICAL FIELD AND OBJECTIVE OF THE INVENTION

The invention relates to a device for separating and screening of bulk materials, in particular crop material. In particular, the device includes a self-propelled combine with a threshing device supported by the combine frame, a rocker disposed downstream thereof, a return plate disposed thereunder and a preparation plate for feeding the crop material to the separating/screening process (for the separation of grain from chaff), disposed underneath the threshing device and the return plate and extending from the threshing device to the return plate.

It is the object of the invention to provide a separating/screening device for bulk materials of the most diverse kinds which, in the form of a simple, compact and cost-efficient component, makes possible an optimal separating effect of the bulk material mixture in a rational manner, along with an advantageous guidance of the air.

It is a further object of the invention to equip combines with a separation zone for grain and chaff/stalk parts which, with a simple and cost-saving design and spatially advantageous layout and disposition, making possible a perfect and rational separation of chaff/stalk parts and increased separation effectiveness of the cleaning process.

SUMMARY OF THE INVENTION

In place of the customary screening device or in addition to the screening device, the self-propelled combine has been equipped with a specially designed separation zone for grain and chaff/stalks, which is formed by a zig-zag separator having a plurality of separating conduits disposed behind each other in the direction of the feed-through of the crop material and extending over the entire separator width. Each separated conduit is diverted once or several times in the vertical direction and thus in the flow-through direction of the air flow, i.e. each conduit encloses a single or multiple acute or obtuse angle or contain a single or multiple zig-zag shape.

Because of these separator conduits which are angled or zig-zag-shaped, rotating vortices of crop material are generated within the air flow passing through their interior. Heavier grains can fall downward and out of the separator from these rotating vortices, and the lighter chaff/stalk parts are blown upward. When the light parts fall down again they are caught by a vortex of crop material and transported forward to the next vortex of crop material and are then taken out of the top of the separator.

The air flow in the separator can be controlled on the one hand by a pressure- and suction air blower associated with the separator, and on the other hand the separator conduits are made continuously adjustably in respect to each other in regard to the size of their diameters and in particular the inlets and outlets of the conduit, so that the flows for the grain/chaff separation process can be adjusted by means of these adjustments and in this way an optimum separation is achieved.

It is furthermore advantageous to house the zig-zag separator in a sealed separator chamber and in the course of this to dispose an intermediate plate with an adjustment flap for setting the air flow in this separator chamber, which aids in the separation of the mixed materials.

The zig-zag separator with its separator conduits is simply designed and can be produced at cost savings, forms a compact component and the adjustment of the individual segments (of the sheet metal strips forming the separator conduits) can also be simply and safely performed via shafts, levers and a linkage of adjusting bars.

The rational removal of grain/chaff is assured by means of this screen/separator device operating on the separator principle, because of which efficiency has been increased in this processing zone.

Chaff/stalk parts are continuously removed from the fed-in mixed material layer by the zig-zag separator, so that they can no longer hinder the separating process in the material layer, because of which the effectiveness of separation is increased and an increased flow-through of material along with decreasing grain losses is made possible.

The angled conduits of the separator cause an effect on the air flow which has a cross-flow separation effect on the flow of material being aspirated, so that grains possibly forced along with the chaff/stalk parts are returned to the material layer on the zig-zag separator.

Because of the zig-zag-shaped disposition of the separator conduits, the material flow through them is exposed to several cross-flow separations, so that missorted chaff/stalk parts are securely separated and again introduced into the material layer above the separator, which results in a high degree of cleanliness of the grain material.

Short stalk parts or stalk knots, in particular, of a length of approximately 30 mm which in the customary segment screen are usually trapped along with the grain and wind up in the grain reservoir are aligned crosswise to the airflow because of the advantageous mode of operation of the zig-zag separator and are optimally removed.

The reason for this lies in that in contrast to the conventional segment screen the stalk parts are inserted into the cross-flow separator at the bent places with their longitudinal axes crosswise to the airflow, so that the stalk parts have a large silhouette in respect to the air flow and therefore are carried away with the air flow because of the effective high flow force.

When the separator is fed bulk material from the top, it constitutes a separator screen by means of which the heavy material parts fall downward and the lighter material parts are discharged upward by the screen. When feeding bulk material from the bottom, the heavy material parts practically fall down directly and the lighter material parts are blown upwards through the separator.

A concept of the invention is seen to be the particular design and effect of the zig-zag separator itself, which has its own use for separating and screening bulk materials of the most diverse kinds. A second concept of the invention lies in the combine with the zig-zag separator embodied in two variants and resulting in two work functions.

BRIEF DESCRIPTION OF THE DRAWINGS

An exemplary embodiment is shown in variations and will be described in more detail below. Shown are in.

DETAILED DESCRIPTION OF THE PREFERRED EMBODIMENTS OF THE INVENTION

Figure 1:
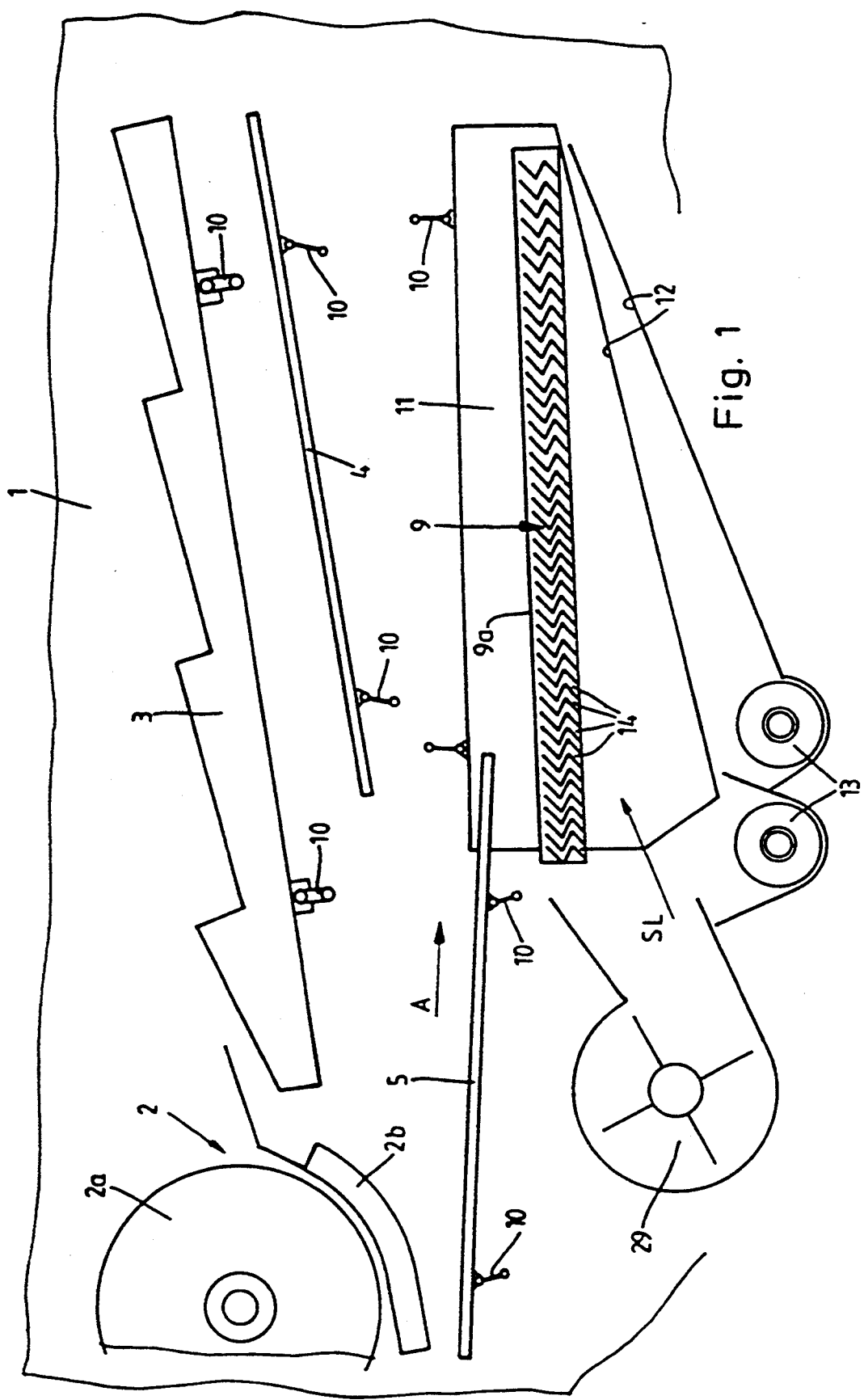
FIG. 1 a schematic lateral view of a partial section of a combine with a zig-zag separator screen placed downstream of the preparation plate and disposed underneath a return plate, FIG. 2 a vertical section through a separator conduit of the separator screen extending zig-zag-shaped in the vertical direction, FIG. 3 a vertical section through a portion of the separator screen with adjustable sheet metal strips forming the separator conduits, FIG. 4 a schematic partial view of a portion of the combine with a zig-zag separator disposed above a screening device and below the return plate, along with associated impeller conveyors, suction blower, sealed separator chamber and an intermediate plate with an air adjustment flap disposed therein, FIG. 5 a vertical section through a separator conduit of the zig-zag separator of FIG. 4 extending upwardly at an obtuse angle.

As shown in FIGS. 1 and 4, the self-propelled combine has in a combine frame (1) a threshing device (2), formed by a thresher drum (2a), a threshing basket (2b) and a turning drum (2c), a rocker (3) disposed downstream of this threshing device (2), a return plate (4) disposed under the rocker (4) and a preparation plate (5) disposed underneath the threshing device (2) and the rocker (3) and extending from the threshing device (2) to the return plate (4), from where the threshed crop material is conveyed into the following processing station, formed by a screening device (8) (FIG. 4) and/or a zig-zag separator (9, 90) (FIGS. 1 and 4), for the screening process, i.e. the separation of grain (6) and chaff/stalk parts (7).

The rocker (3), the return plate (4), the preparation plate (5) and the screening device (8) are brought into oscillating movements in a known manner via crank drives (10). In connection with this it is preferred, as shown in FIG. 4, to dispose the screening device (8) and the preparation plate (5) in a common screening box (11), which is then driven together with both of the devices (5, 8) via the crank drives (10). Discharge plates (12) for the grain (6) are disposed in the screening box (11) below the screening device (8) and/or the zig-zag separator (9, 90), which lead to collecting worms (13) disposed crosswise to the threshed flow direction (A) of the crop material in the screening box (11).

As shown in FIG. 4, the zig-zag separator (9, 90) is placed downstream of the preparation plate (5), looking in the flow direction (A) of the threshed crop material, and can be provided in the combine frame (1) in place of the screening device (8) or in connection with the screening device (8) as shown in the Figure.

The zig-zag separator (9, 90) is equipped with a plurality of separator conduits (14, 144) which are diverted once or several times in the vertical direction and through which a separator air stream (SL) flows, and its top or bottom is covered by a screening surface (9a, 90a) for spreading the flow of threshed bulk material (crop material 6, 7) over the length of the separator.

Figure 2:
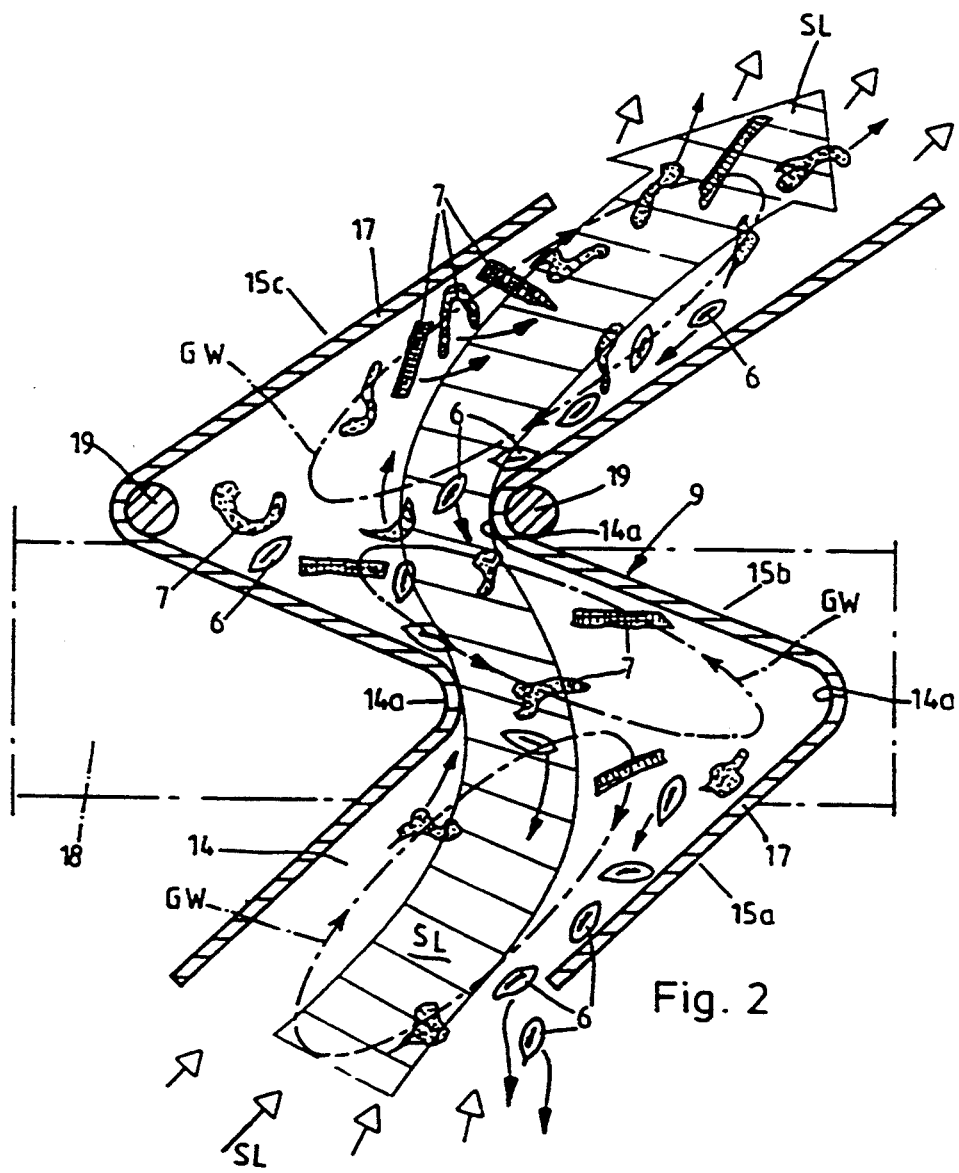
Figure 3:
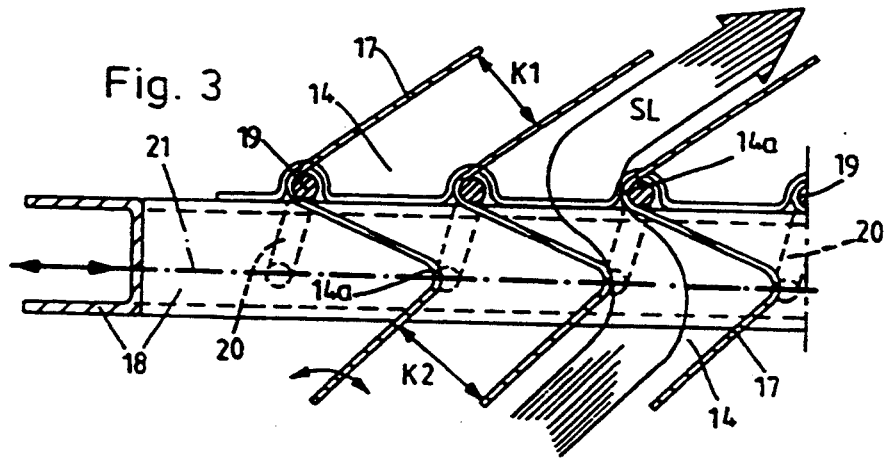

The zig-zag separator (9) of FIGS. 1 to 3 is formed by a close-meshed zig-zag separator screen with separator conduits (14) extending in a vertical direction in a zigzag shape, and the threshed crop material (6, 7) is spread on its upper screening surface (9a).

The zig-zag separator (90) in FIGS. 4 and 5 is equipped with separator conduits (144) extending in the vertical direction and angled once or several times obtusely or acutely, and the crop material (6, 7) is placed on screening surface (90a) located on the bottom.

The separating conduits (14,144) of the zig-zag separator (9, 90) are disposed behind each other, looking in the flow direction (A) of the crop material, and extend over the entire width of the separator (9, 90).

In the embodiment of FIG. 1, the zig-zag separator (9) is disposed in the combine as a zig-zag separator screen in place of the screening device (8) and is seated in the screening box (11) and is movable together with it in the same way as a screening device (8).

In the embodiment of FIG. 4, the zig-zag separator (90) ms disposed in the combine in addition to the screening device (8) and in this case is located above the screening device (8) and below the return plate (4). The screening device (8) can be formed by a single- or multiple flat screen. The separating conduits (144) in FIGS. 4 and 5 are embodied as obtuse- or acute-angled in the vertical direction and therefore angled once in the longitudinal direction of the conduit. In the lower area they extend obliquely upward against the flow direction (A) of the crop material and in the upper area they extend obliquely upward and in the flow direction (A). But these separator conduits (144) can also be angled twice, three times or more.

The separator conduits (14) of the separator screen (9) of FIGS. 1 to 3 are embodied to extend zig-zag-shaped in the vertical direction and are therefore angled several times in the longitudinal direction of the conduit and these angles can also enclose obtuse or acute angles.

On the bottom, the zig-zag-shaped separator conduits (14) extend obliquely upward in the flow direction (A) of the crop material, in the center obliquely upward and against the flow direction (A), and at the top again obliquely upward and in the flow direction (A).

The separator conduits (14) cause, in their three angle legs (15a, b, c) (FIG. 2) of the zig-zag shape and their two angle legs (16a, 16b) (FIG. 5) of the angle shape, the creation of rotating material vortices (GW), which separate the grain (6) from the chaff/stalk parts (7) and move the grain (6) downward and the chaff/stalk parts (7) upward. Because of the zig-zag-shaped or angled diversion of the air flow (SL) in the separator conduits (14), the material vortices (GW) shown in FIG. 2 and 5 are created. These vortices cause the material (6, 7) to rotate on oval, elliptical or long ovally extending movement paths (curved paths)(GW). Thus two, three or a plurality of material vortices (GW) are located one behind the other in the separator conduits (14).

The crop material (6, 7) leaves the edge area of the upper separator conduit (14, 144) at the bends (14a, 144a) of the separator conduits (14, 144) and is subjected to an intense cross- flow separation in the air flow (SL). Light components, such as chaff and stalk parts (7), are moved upward in the air flow (SL) with the upper material vortex (GW) and the heavier grain (6) is moved downward with the lower material vortex (GW) to the next material vortex (GW) or is expelled. Possibly missorted chaff/stalk part (7) which reach the bottom together with the grain (6) are sorted out at the next bends (14a, 144a) and are conveyed upward out of the sorting process in the mentioned manner by the material vortex.

The air flow (SL) moves from the bottom to the top and is turbulent. The material to be separated (6, 7)

glides down on the upper area(s) of the separator conduits (14, 144), and grain (6) and chaff/stalk parts (7) are inserted into the air flow (SL) at their gliding speed at the bend(s) (14a, 144a). The zig-zag separator (9, 90) operates as a cross-flow separator in these bends (14a, 144a), and in the separator conduits (14, 144) between the bends (14a, 144a) as a vertical separator.

A very good separation quality is achieved by the repeated sequence of the cross-flow direction at the bends (14a, 144a), i.e. chaff/stalk parts (7) which might possibly come down through the upper bend (14a, 144a) together with the grain (6) are separated in the second or third bend (14a, 144a) located below and transported upward.

The separation conduits (14,144) are formed by angled or zig-zag-shaped sheet metal strips (17), which are held in the horizontal plane by a frame (18) of the combine frame (1).

The sheet metal strips (17) of the separator (9, 90) are rigidly disposed on the frame (18) and are thus evenly disposed in respect of the flow-through cross-sectional size of the separator conduits (14). However, it is preferred to keep the sheet metal strips (17) adjustably in the frame (18), so that the cross-sectional size of the separator conduits (14, 144) is continuously adjustable.

As shown in FIG. 3, the sheet metal strips (17) of the zig-zag separator screen (9) are pivotably seated at bend (14a)— of the conduits (14) on horizontal axis (19). Axes (19) are fastened on the sheet metal strips (17) and pivotally on the frame (18). Metal strips (17) are connected via these axes (19) via levers (20) with a linkage of adjusting bars (21). Accordingly, when the linkage bars are displaced, causes pivoting of the levers (20) and a turning of the axes (19), so that the sheen metal strips (17) are pivoted around their axes (19) and in the course of this the size of the cross section of the separator conduit inlet (K 2) is changed in relation to the separator conduit outlet (K 1), as shown in FIG. 3.

In accordance with the embodiment of FIG. 4, the zig-zag separator (90) forms a sealed separator chamber (25) by means of seals (24) disposed between the return plate (4) and the screen device (8).

One impeller conveyor (22, 26)—rotating star feeder—is disposed respectively at the front and back, and a suction blower (23) between the rear impeller conveyor (26) and the return plate (4). The seals (24) which form closed separator chamber (25), extend at the front between the return plate (4) and the front impeller conveyor (22), and at the back from the return plate (4) around the suction blower (23) as far as the rear impeller conveyor (26).

The impeller conveyors (22, 26) are used as cellular wheel sluices for the build-up of the partial vacuum or overpressure necessary for conveying the material in the separator chamber (25).

The chaff and the stalk parts (7) are ejected axially at both ends of the suction blower (23) through its discharge pipe (23a) with attached elbow (23b).

In addition, the rear impeller conveyor (26) discharges exiting heavy stalk parts (7) and straw knots, which had not been removed by the separator (90).

An intermediate plate (27) with an adjustment flap (28) for setting the separator air flow (SL) is disposed above the separator (90) in the separator chamber (25).

This intermediate plate (27) with the adjustment flap (28) is required because there is a larger proportion of grain (6) which has not yet been discharged in the front third of the material layer, looking in the material feed direction (A), and therefore the flow resistance of this material layer is greater, so that an increased total pressure of the air flow (SL) is needed in this area.

A compressed air blower (29) with an air inlet (30) which can be adjusted if required is placed below the preparation plate (5) upstream of the zig-zag separator (9) or the screening device (8) and the separator (90) disposed above them for forming the separating air flow (SL).

In the embodiment of FIG. 4 it is preferred to provide either only the suction blower (23) or the pressure blower (29).

When the zig-zag separator (90) is disposed above the screening device (8), the separator (90) assumes an inclined position, so that the gap (X) between the separator (90) and the screening device (8) is reduced in height towards the rear—in the direction toward the impeller conveyor (26)—which causes an even air flow and pressure distribution of the separator air (SL) over the entire separator length (from the front to the back).

The separator (9, 90) is disposed in the combine either stationary or movable, such as the screening device (8).

The material mixture (6, 7) is spread directly from above on the screening surface (9a) of the zig-zag separator screen (9) of FIGS. 1 to 3 from the preparation plate (5) without the impeller conveyor (22) and the blower (23). The grain (6) falls down through the separator conduits (14) and the chaff/stalk parts (7) are driven upward by the air flow (SL) and conveyed off.

As a rule, this separator screen (9) makes movements, such as oscillation movements, but can also be disposed stationary.

The sheet metal strips (17) of this separator screen (9) are close-meshed in order to achieve a good screening function.

The material mixture (6, 7) is spread in the zig-zag separator (90) from below against the screening surface (90a) by the impeller conveyor (22). The chaff/stalk parts (7) are upwardly discharged by means of the air stream (SL) through the separator conduits (144) and the grain (6) is kept back and falls downward.

Grain (6) which was aspirated and caught in nests of chaff/stalk parts is released when the nests are dissolved by the air flow (SL) in the conduit bends (144a) and falls downward.

As a rule, this separator (90) is disposed stationary and the sheet metal strips (17) of its separator conduits (144) are kept close-meshed to assure a separation of the grain and chaff.

What is claimed:

1. A device for separating and screening of threshed crop material, comprising a zig-zag separator (9, 90) having separation conduits (14, 144) which have multiple bends in a vertical direction, a separator air stream (SL) flowing through said separator, and a screening surface (9a, 90a) on a top or bottom of said separator to spread the flow of crop material (6, 7) entering the separator.

2. A device in accordance with claim 1, wherein said zig-zag separator (9) is formed by a close-meshed zig-zag separator screen with separator conduits (14) extending in said vertical direction in a zig-zag shape, said crop material (6, 7) is spread on said screening surface (9a) located on a top of said separator (9).

3. A device in accordance with claim 1, wherein said zig-zag separator (90) is equipped with separator conduits (144) extending in said vertical direction and multiply angled, said crop material (6, 7) is being spread against said screening surface (90a) on a bottom of said separator (90) by said separator air stream (SL).

4. A device in accordance with claim 1, wherein said zig-zag separator (9, 90) forms a cross flow orientation of a rising separator air flow (SL) at bends (14a, 144a) of said separator conduits (14, 144) and a rotating material vortex (GW) in the separator conduits (14,144), by means of which light chaff/stalk parts (7) of said crop material are moved upward and the grain (6) of said crop material is released downward.

5. A self-propelled combine with a threshing device supported by the combine frame, a rocker disposed downstream thereof, a return plate disposed thereunder and a preparation plate for feeding crop materials to a separating/screening process, for separating grain (6) from chaff (7) disposed underneath said threshing device and said return plate and extending from the threshing device to said return plate, comprising a zig-zag separator (9, 90) having separation conduits (14, 144) which are multiply angled in a vertical direction, a separator air stream (SL) flowing through said separator, and a screening surface (9a, 90a) on a top or bottom of said separator to distribute the flow of crop materials (6, 7).

6. A combine in accordance with claim 5, wherein said separator conduits (14, 144) are formed by sheet metal strips (17) which are angled in a zig-zag shape and which are maintained on a frame (18) of said combine frame (1) in a horizontal plane.

7. A combine in accordance with claim 6, wherein said sheet metal strips (17) of the separator (9, 90) are seated in a continuously adjustable manner on said frame (18) in a flow-through cross-sectional size (K 1, K 2) of said separator conduits (14).

8. A combine in accordance with claim 7, wherein each of said sheet metal strips (17) of said separator (9) are fixed at an angle (14a) on a horizontal axis (19) fastened on the sheet metal strips (17), each of said sheet metal strips (17) being connected via these axes (19) via levers (20) with a linkage of adjusting bars (21) which, when said adjusting bars are displaced, causes pivoting of the levers (20) and a turning of the axes (19), so that said each of said sheet metal strips (17) are pivoted around their axes (19) and in the course of the pivoting of said sheet metal strips changes the size of a cross section of a separator conduit inlet (K 2) in relation to a separator conduit outlet (K 1), (K 2) wherein, said separator conduit inlet is greater than said separator conduit outlet (K 1).

9. A combine in accordance with claim 8, wherein said zig-zag separator (90) is disposed between a screening device (8) disposed on a bottom of said combine and an upper limit of said return plate (4).

10. A combine in accordance with claim 9, wherein an impeller conveyor (22) is assigned to said zig-zag separator (90) at a front end receiving said crop materials, and a suction blower (23) to a rear end.

11. A combine in accordance with claim 10, wherein said zig-zag separator (90), together with seals (24) disposed between said return plate (4) and said screening device (8), forms a closed separator chamber (25).

12. A combine in accordance with claim 11, wherein impeller conveyors (22, 26) are assigned to said zig-zag separator (90) respectively at a front and a back, and a suction blower (23) between a rear impeller conveyor of said impeller conveyors (26) and said return plate (4), wherein said seals (24) to form said closed separator chamber (25) are disposed at a front between said return plate (4) and a front impeller conveyor of said impeller conveyors (22) and extend at a back from said return plate (4) around said suction blower (23) as far as said rear impeller conveyor (26).

13. A combine in accordance with claim 12, wherein an intermediate plate (27) with an adjustment flap (28) for setting a separator air flow (SL) is disposed above said zig-zag separator (90) in said separator chamber (25).

14. A combine in accordance with claim 13, wherein a compressed air blower (29) is placed upstream below said preparation plate (5) of said zig-zag separator (90) or said screening device (8) and said zig-zag separator (90) disposed above them forms said separator air flow (SL).

15. A combine in accordance with claim 14, wherein said zig-zag separator (9, 90) is disposed stationary in said combine.

16. A combine in accordance with claim 14, wherein said zig-zag separator (9, 90) is movably seated in said combine corresponding to said screening device (8).

17. A combine in accordance with claim 16, wherein said zig-zag separator (90) is disposed obliquely in the flow through direction of said crop materials (A), forming a gap (X) narrowing from a front toward a back between said separator (90) and said screening device (8) located below said separator.

* * * * *